Nov. 20, 1945.　　　O. E. ESVAL ET AL　　　2,389,142
GYRO-STABILIZED SEXTANT
Filed Sept. 26, 1941　　　4 Sheets-Sheet 4

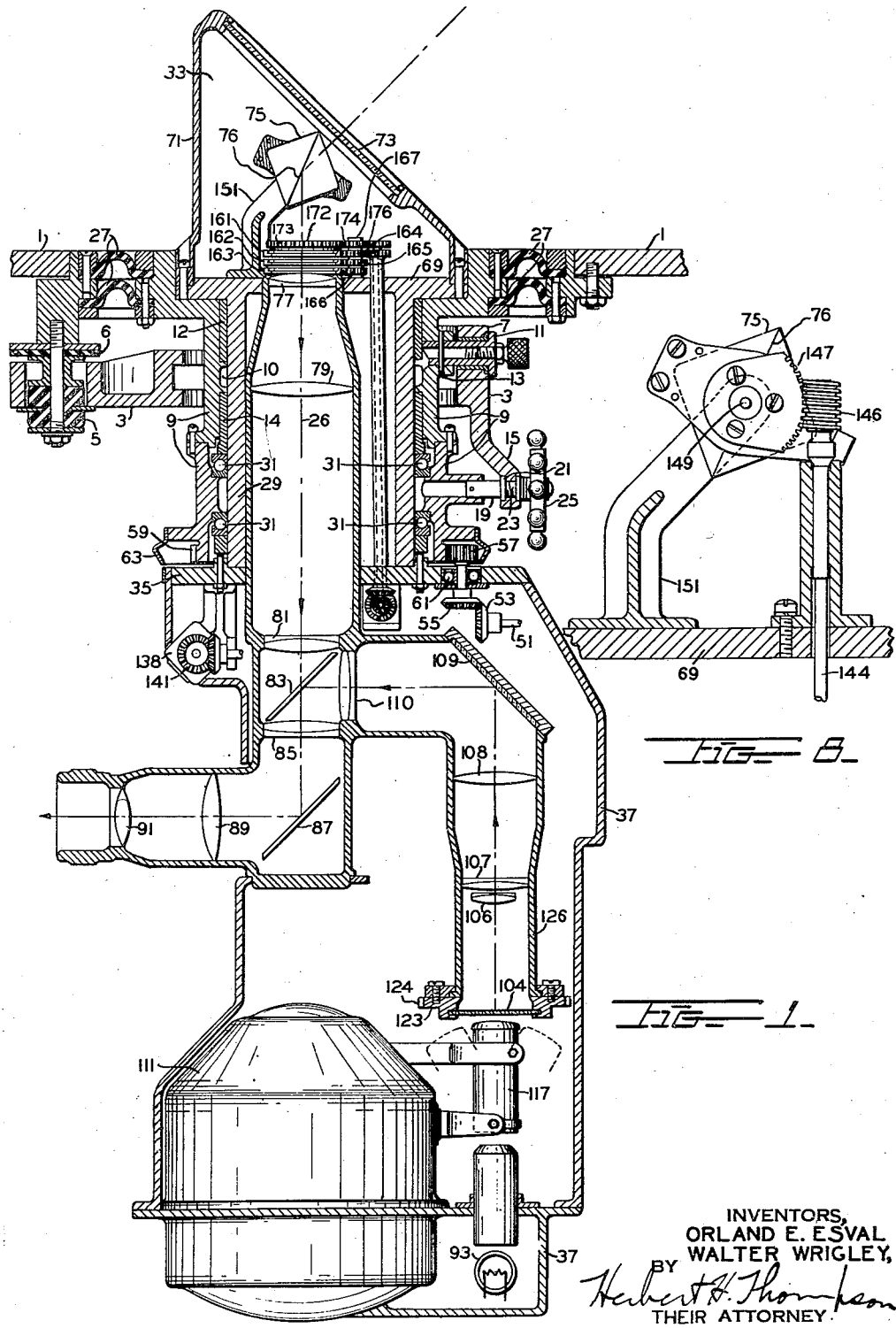

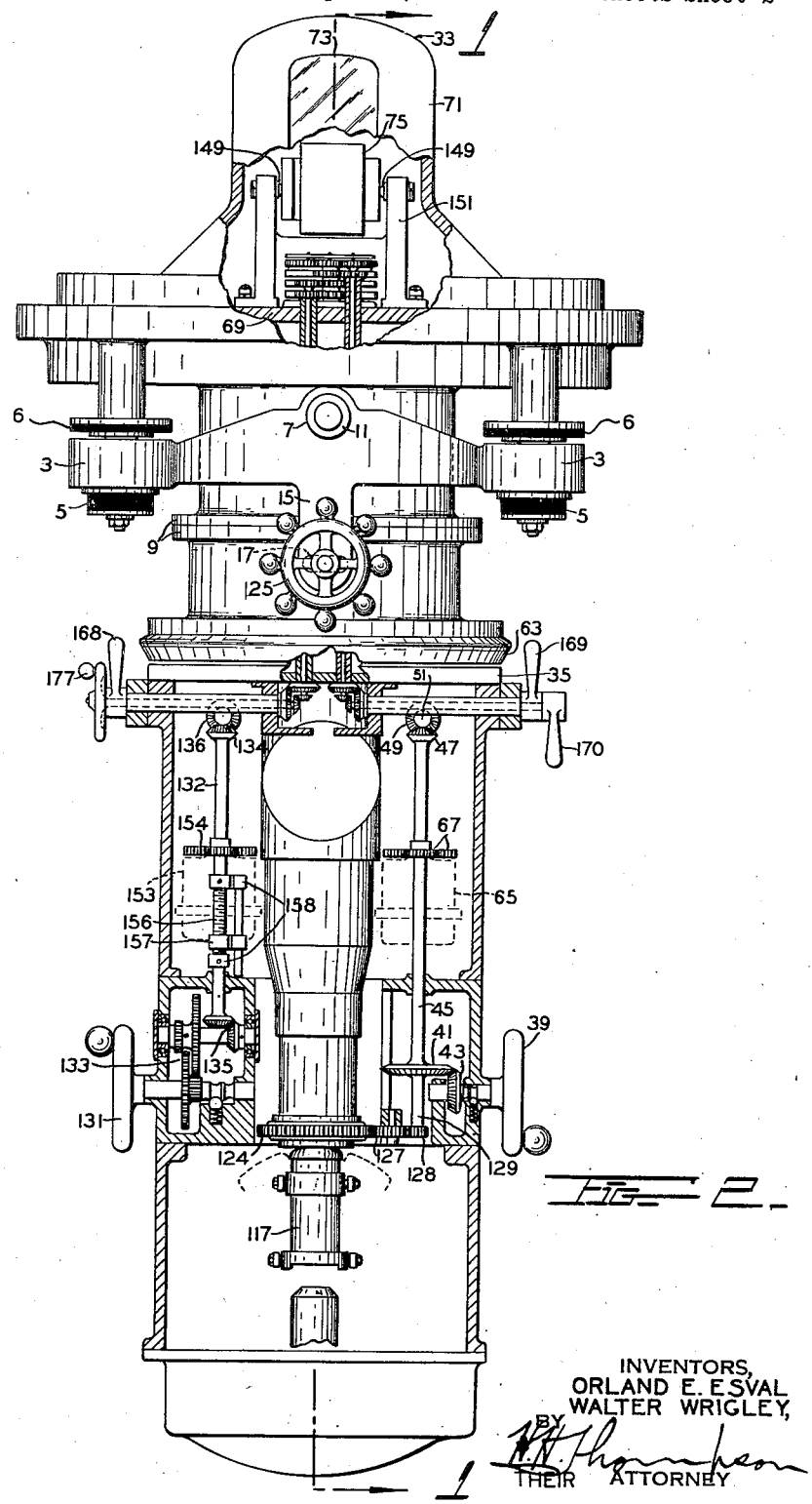

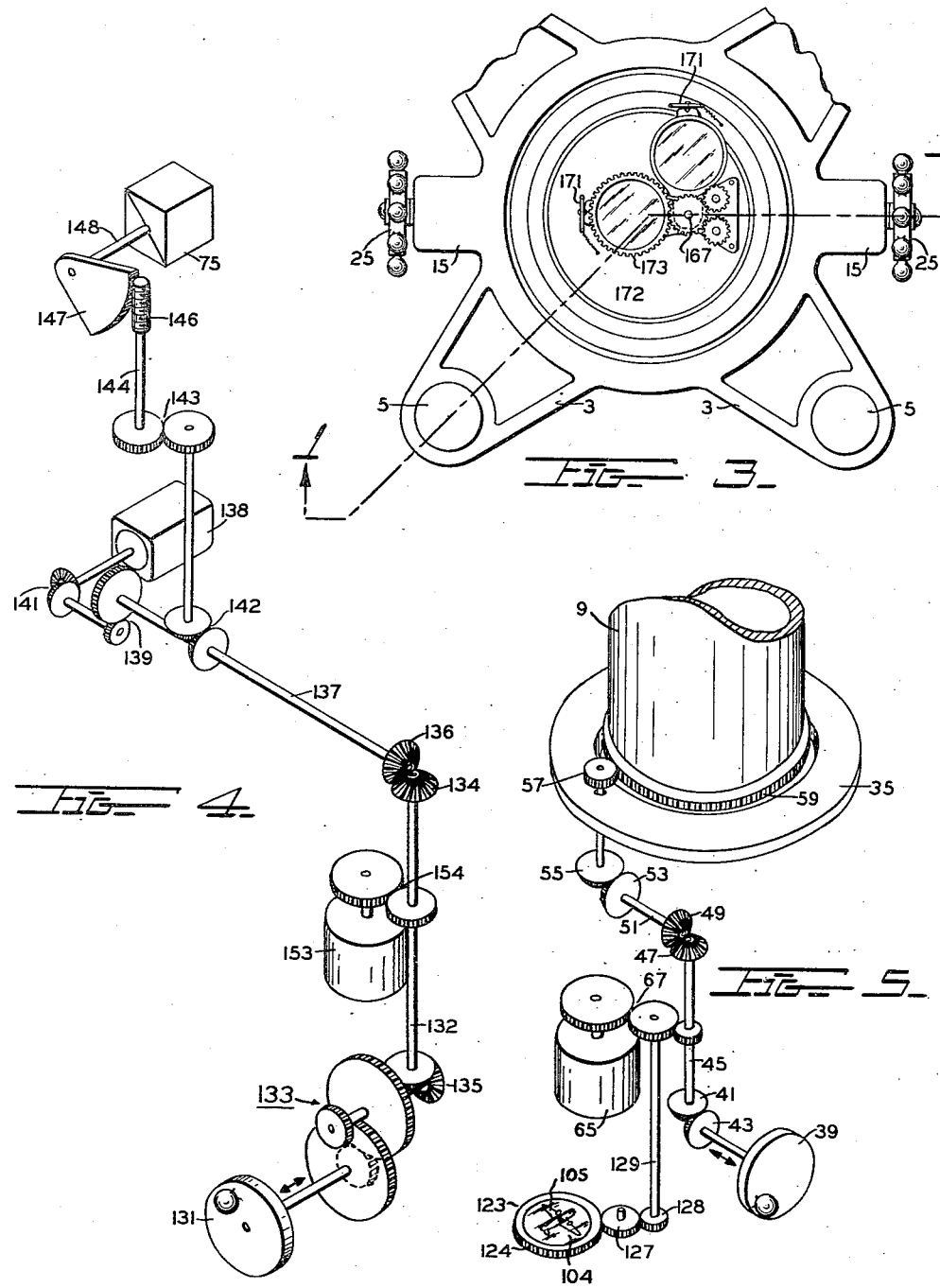

INVENTORS,
ORLAND E. ESVAL
WALTER WRIGLEY,
BY
THEIR ATTORNEY.

UNITED STATES PATENT OFFICE 2,389,142

GYRO-STABILIZED SEXTANT

Orland E. Esval, Merrick, and Walter Wrigley, Hempstead, N. Y., assignors to Sperry Gyroscope Company, Inc., Brooklyn, N. Y., a corporation of New York Application September 26, 1941, Serial No. 412,398

7 Claims. (Cl. 88—2.2)

The present invention relates to the art including sighting instruments, and more particularly to gyro-stabilized sextants for use on aircraft.

The present invention represents an improvement over the device disclosed in U. S. Patent No. 2,177,094, issued October 24, 1939, in the name of L. F. Carter et al. This prior patent discloses a sextant having a gyro-stabilized reference reticle, in which the reticle is formed by light passing from a fixed light source through narrow crossed slits borne by the gyro. One of the disadvantages of this system lies in the relative movement between light source and crossed slits, whereby the relative intensity of different portions of the slits varies according to the attitude of the aircraft. In this way, the use of the instrument is limited to small angular departures from normal trim.

The present invention eliminates these difficulties by placing the light source, either a primary or secondary source, at the center of relative motion of the reticle, thereby maintaining constant relationship between light source and reticle. The reticle image is then projected or focussed on a ground glass screen, from which it is inserted into the main sighting optical system, as by a reflex mirror.

Another feature of the present invention is the mounting of the entire instrument on the craft, thereby avoiding many errors of the hand-supported instrument and overcoming the previous necessity of averaging a number of readings. In addition, the instrument is particularly adapted for use in pressure-cabin type aircraft, in that the rotatable sighting head is projected outside the cabin wall without affecting the pressure conditions inside the cabin, while maintaining full flexibility of operation.

A further feature of the present invention resides in providing means for adjusting the optical axis of the instrument to allow for the normal trim of the craft. Also, a trim image is marked on the ground-glass screen upon which the reticle image is projected and is maintained fixedly oriented with respect to the craft, whereby relative motion between trim image and stabilized reticle image will indicate attitude variations of the craft.

Accordingly, it is an object of the present invention to provide an improved gyro-stabilized sextant.

It is another object of the present invention to provide an improved reticle image-producing means for a gyro-stabilized sighting instrument.

It is a further object of the present invention to provide an improved gyro-stabilized sextant particularly suitable for use with pressure-cabin type aircraft.

It is still another object of the present invention to provide an improved aircraft trim indicator associated with a sighting instrument, such as a gyro-stabilized sextant.

It is a still further object of the present invention to provide an improved craft attitude compensating means for craft-supported sighting instruments, such as gyro-stabilized sextants.

Other objects and advantages of this invention will become apparent as the description proceeds.

In the drawings,

Fig. 1 shows a cross-sectional elevation view of our improved gyro-stabilized sextant, taken along line 1—1 of Figs. 2 and 3.

Fig. 2 shows an elevation view, partly in section, of the device of Fig. 1, taken at right angles to one portion thereof.

Fig. 3 shows a plan view of the devices of Figs. 1 and 2 with sighting hood and entrance prism removed.

Fig. 4 shows a schematic perspective view of the elevation control of the line of sight.

Fig. 5 shows a similar schematic perspective view of the azimuth control of the line of sight.

Fig. 8 is a detail elevation view, partly in section, of the elevation control of the line of sight.

Figure 6:
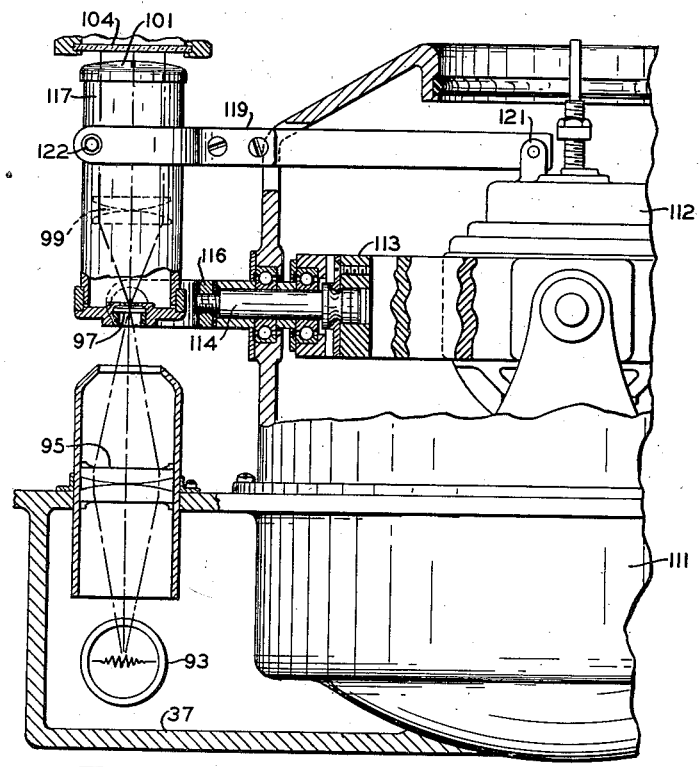
Fig. 6 shows an elevation view, partly in section, of the gyro-stabilized reticle of Figs. 1 and 2.

Referring to the drawings, reference numeral 1 represents the outer wall of the airplane cabin. A supporting spider 3 is hung from wall 1 as by resilient mountings 5. Rubber pad 6 forms a shock buffer should spider 3 rise suddenly. Spider 3 has formed in it two opposed bushings 7 extending inwardly. Pivotally supported on bushings 7 is the other supporting case 9 of the sextant, shown as formed of several bolted sections. This pivoted support is formed by a bushing 11 fixed in supporting case 9 as by a pin 13 and rotatable within bushing 7. Spider 3 has two opposed depending portions 15, each having a horizontal slot 17. Fastened to supporting case 9 is a stud 19 having a shoulder 21 and a threaded portion 23 which passes through slot 17. A threaded hand wheel 25 is provided which is adapted to clamp spider 3 to supporting case 9 upon tightening of the handwheel 25 upon thread 23.

The pivot axis of bushings 7 and 11 is placed exactly along the transverse or athwartship axis of the craft. By means of slot 17 and handwheel 25, the orientation of the optical axis 26 of the instrument may be compensated for any normal or fixed trim of the craft by shifting supporting case 9 relative to spider 3 until the optical axis 26 is truly vertical, whereupon handwheel 25 is tightened to maintain this trim adjustment. The conditions which indicate when the optical axis 26 is actually vertical are described below.

Since the instrument is intended for use in pressure-type aircraft cabins, supporting case 9 is joined to wall 1 of the craft by flexible membranes 27, which maintain an air-tight condition within the cabin but still permit slight relative motion between supporting case 9 and wall 1 in order to allow the trim adjustment just described.

The instrument proper is rotatably supported within outer supporting casing 9. As shown best in Fig. 1, the instrument comprises a tube 29 concentrically positioned within case 9 and supported therefrom as by bearings 31 which permit tube 29 to rotate within supporting case 9. Tube 29 carries at its upper end the optical head 33 which projects outside wall 1. At its lower end, tube 29 is connected to a platform 35. Lower casing 37 is supported from platform 35 and carries most of the remaining elements of the instrument.

In order to maintain an air-tight condition, two cylindrical sleeves 12, 14 are fastened to the outer surface of tube 29, and these sleeves 12, 14 and the inner surface of case 9 are machined to fit very accurately so as to maintain a practically air-tight running fit. A thin, practically capillar film of lubricant is placed between these closely fitting surfaces. The large film area and close clearance act to preserve this air seal. In addition, the annular groove 10 between sleeves 12 and 14 is filled with oil or other lubricant, inserted through hollow bushing 11 with which this annular space 10 connects, thereby further improving the air seal.

The lower casing 37, tube 29 and head 33 are rotated in azimuth from azimuth control wheel 39 (Figs. 2 and 5). This wheel 39 is connected by detachable bevel gears 41, 43 to shaft 45, which carries a bevel gear 47 at its upper end. Bevel gear 47 mates with bevel gear 49 to turn cross shaft 51, also shown in Fig. 1. Cross shaft 51 has bevel gear 53 attached to its other end, this bevel gear 53 mating with bevel gear 55 to turn pinion 57. Case 9 has an annular ring gear 59 fastened to or formed integrally with itself, and this ring gear 59 meshes with pinion 57. Accordingly, rotation of azimuth control wheel 39 will cause pinion 57 to walk around ring gear 59, which is fixed relative to the craft. Pinion 57 passes through bearing 61 in platform 35 and accordingly carries that platform, and hence the entire instrument, around with itself.

Supporting case 9 may have a scale 63 fastened to it, which cooperates with an index on platform 35 to give azimuth indications. Also, a Selsyn transmitter 65 may be connected to shaft 45 as by gearing 67 to transmit azimuth indications to a remote point.

Sighting head 33 is supported on a platform 69 fastened to or integral with the upper part of tube 29. This platform 69 supports a hood 71 having a window 73 for viewing the distant object to be sighted. Window 73 preferably contains means for mimimizing frosting thereof, such as current carrying wires. Alternatively, it may be formed of a material which absorbs light radiation and converts it into heat. The image of the distant object is picked up through window 73 by entrance prism 75, which is formed as a double prism having a reflecting boundary 76 between the two sections thereof. The image is reflected by prism 75 through lenses 77, 79, 81 forming the main optical system of the sextant, and then through reflex mirror 83, where the object image is superposed on the reticle image and trim image, as will be later described. The combined image is projected through objective 85 and reflected by mirror 87 through field lens 89 and eyepiece 91 to be there viewed by the operator.

Figure 7:
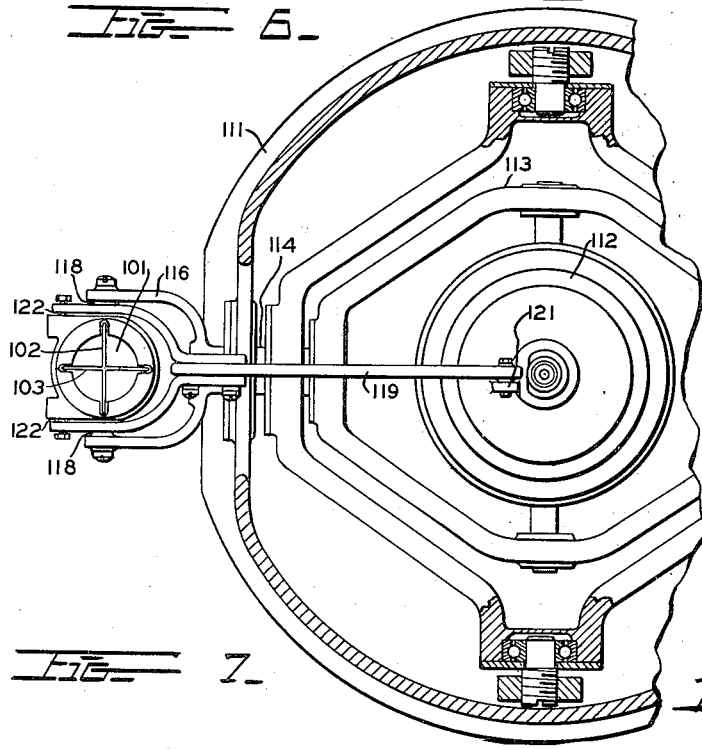
Fig. 7 shows a plan view, partly in section, of the detail shown in Fig. 6.

Referring now more particularly to Figs. 6 and 7, the reticle image is obtained by projecting a light source 93, preferably formed by an incandescent lamp, through a condensing lens 95 onto a flashed opal 97 which collects light from source 93 and acts as a secondary light source. Light from flashed opal 97 is collimated by collimating lens 99 and projected in parallel rays through a blocking screen 101 having crossed slits 102, 103 through which the light rays from secondary source 97 pass onto a ground glass screen 104 in the form of a cross of light. The image of this light cross is projected by lenses 106, 107, 108, mirror 109 and lens 110 onto reflex mirror 83 to be superposed on the object image received from entrance prism 75.

Ground glass screen 104 may have drawn on it some distinctive pattern, such as the outline image of an airplane, which we shall call the "trim" image because of its function, as will be later described. This trim image and the reticle light cross are projected together by lens system 106, 107, 108, 109, 110 to be superposed on the object image at reflex mirror 83. The trim image may be drawn with fluorescent material which becomes visible only when irradiated by ultra-violet light. In this way the intensity of the trim image can be controlled by controlling the amount of ultra-violet radiation from a source not shown.

Primary light source 93 and condenser lens 95 are fixed to housing 37, as is most clearly shown in Fig. 6. However, the light cross projected through shield 101 is stabilized by gyro 111 so as to remain always in a horizontal plane. Thus, referring to Figs. 6 and 7, gyro rotor housing 112 is mounted in gimbal ring 113 for rotation about a horizontal axis, and ring 113 is pivotally mounted on main housing 37, one pivot being shown as 114. Pivot 114 is extended into forked member 116, inside which housing 117, which carries secondary light source 97, collimator 99 and light shield 101, is pivotally mounted about pivots 118. The pivot axis 118 is made to pass through the center of secondary light source 97, which is also made coaxial with pivot 114. In this way, secondary light source 97 is substantially immobile with respect to main housing 37, merely rotating about its center, which is fixed with respect to housing 37. The upper part of housing 117 is connected to the rotor housing 112 by a link 119 pivotally fastened to the rotor housing 112 at 121 and to housing 117 at 122. In this manner, housing 117 is always kept parallel to the spin axis of gyro 111, which is kept vertical by any well known gyro erecting means. The light cross formed by shield 101 is thereby maintained stabilized in a horizontal plane at all times.

The time image, as described above, is placed on ground glass screen 104. It may be drawn in shape of an airplane 105 and oriented so as to indicate the actual craft heading. Since the entire housing 37 rotates during operation of the device, it is necessary to provide some means for maintaining the trim image fixedly oriented with respect to the craft. This is done by rotating ground glass screen 104 in a reverse direction by the same amount that housing 37 is rotated forward. The screen 104 is mounted in a holder 123 provided with gear teeth 124. Holder 123 rotates about its supporting tube 126. As shown schematically in Fig. 5, screen 104 is driven from azimuth control 39 by means of shaft 129 connected to gearing 67, and gears 128 and 127. Screen 104 thereby rotates equally and oppositely to the rotation of housing 37, whereby the trim image remains fixed with respect to the craft.

It is apparent that the optical axis of the reticle projecting system is maintained vertical at all times by means of its gyro stabilization. Accordingly, the inclination of the instrument optical axis can be determined by comparison with the reticle system axis. For proper adjustment, the instrument optical axis should be vertical when the craft is flying under normal conditions and with normal trim. To obtain this adjustment, the trim adjustment described above is varied until the center of the reticle image falls on the center of the trim image. Once this adjustment is made, it is left set until the normal trim of the ship is changed, whereupon the sextant trim adjustment must be reset.

The system just described also serves to indicate the instantaneous attitude of the craft. When the reticle image center and the trim image center coincide, and the trim adjustment has been made, the operator will know that the craft is flying correctly, with normal trim. When the reticle image center departs from the trim image center, the operator is thereby warned that the craft has deviated from its normal attitude. The departure of the two images will indicate, by its amount and direction, the change in attitude of the craft. Thus an instantaneous trim or attitude indicator is provided.

The control of the line of sight in azimuth has already been described. The control in elevation is secured by rotating entrance prism 75 about a horizontal axis. An elevation control knob 131 rotates a shaft 132 through selectively engageable reduction gearing 133 and bevel gearing 135. Shaft 132 is connected to a bevel gear 134 which meshes with a second bevel gear 136 which turns shaft 137 (see Fig. 4). A rotation counter 138 is rotated by shaft 137 through speed-change gearing 139 and bevel gearing 141. Also coupled to shaft 137, as by bevel gearing 142 and off-setting gears 143, is a drive shaft 144 having a worm 146 connected thereto. Engaging with worm 146 is a worm-wheel sector 147 which is secured to axis 148 of prism 75. As shown best in Figs. 2 and 8, prism 75 is mounted for rotation about horizontally disposed pivots 149 supported in a bracket 151 supported on platform 69. It is clear, therefore, that rotation of elevation control 131 will produce corresponding rotation of prism 75 to change the elevation of the line of sight, which is indicated by the reading of counter 138, suitably calibrated for this purpose.

A Selsyn transmitter 152 (Fig. B) may be coupled to shaft 132 as by gearing 154 to transmit the angle of elevation to a remote point. By these transmitters 153 and 65, the exact position of the sighted object can be transmitted to any desired location. Thus, the present device may be used to locate targets for gun fire, and the remote indications may serve to indicate the target position to a fire control operator. In addition, the trim indicator discussed above will enable the determination of a proper firing time at which the attitude of the craft will not interfere with the accuracy of fire.

Also incorporated in the elevation control is a safety device to prevent injury to the prism. A screw thread 156 is formed on shaft 132, along which a nut 157 travels. Stops 158 prevent excess travel of nut 157 and hence of prism 75, thereby avoiding injurious contact between prism 75 and its mount.

A further feature of the present device resides in the provision of filters insertable into the optical system. Referring to Figs. 1, 2 and 3, three filter holders 161, 162, 163 are shown. Each is fastened to a pinion 164, 165, 166 pivoted about a common axis 167. Each of these pinions 164, 165, 166 is driven from a corresponding one of handles 168, 169, 170 through suitable shafts and gearing, as shown. Thus each of handles 168, 169, 170 serves to swing its corresponding filter into or out of the optical system. A spring detent and notch 171 is used to keep each filter in proper position.

The lowermost filter may be formed of dark glass for viewing the sun. The upper pair of filters may be formed of light polarizing material, whereby relative rotation of one filter with respect to the other may control the light intensity passing into the optical system. For this purpose, the uppermost filter 172 is placed loosely in its holder 161 and has a ring gear 173 formed as its outer periphery. Ring gear 173 meshes with idler pinion 174 and gear 176, which is driven from control wheel 177 by suitable gearing and shafts. Hence, control wheel 177 adjusts the light intensity of the sighted object as viewed by the observer.

Figure 9:
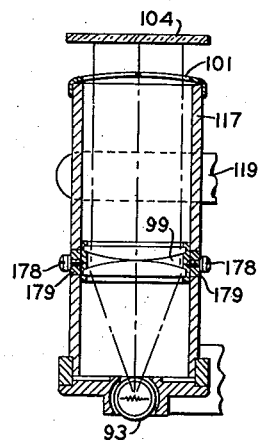
Figs. 9 and 10 show modified forms of the reticle projection system of Figs. 6 and 7.

Fig. 9 shows a modification of the reticle projection system shown in Fig. 6. In Fig. 9, primary light source 93 is mounted at the pivot of housing 117 in place of the secondary light source 97 of Fig. 6. Light source 93 is projected directly upon ground glass 104 through the crossed slots in blocking screen 101 by means of projecting lens 99, as in Fig. 6. Lens 99 may be adjusted as by slots 179 and screws 178 for proper focus and projection. The operation of this modification is otherwise exactly the same as that of Fig. 6.

Figure 10:
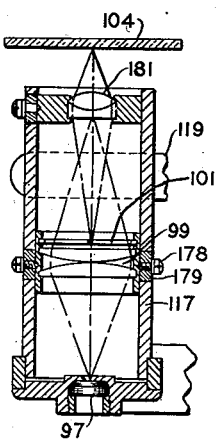

Fig. 10 shows a further modification of a portion of Fig. 6. Here light from secondary light source or flashed opal 97 is focussed by lens system 99 on an added lens 181, through the crossed slits of blocking screen 101. Lens 181 serves to focus the image of the lighted crossed slits onto ground glass 104, rather than merely projecting light through the slits, as in Figs. 6 and 7. It is clear that here, too, flashed opal 97 may be replaced by primary light source 93, as in Fig. 9.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a sextant having an optical system including a combining mirror through which distant objects may be viewed, a gyroscope having a casing, a gimbal ring supporting the gyroscope and casing, a tubular member, means for maintaining the member parallel with the spin axis of the gyroscope, comprising means for supporting the member for rotation about two intersecting axes, a connection between the member and a pivot of the gimbal ring for turning the member about one of the axes, a connection pivoted to the member and to the gyroscope casing for turning the member about the other of the axes, means for illuminating the interior of the member disposed substantially at the intersection of the axes, a reticle disposed within the member illuminated by said means, optical means for projecting rays of light from said reticle onto said mirror to serve as a stabilized reference for the distant objects viewed through the optical system.

2. A sextant according to claim 1, wherein the means for illuminating the interior of the tube comprises a light bulb.

3. A sextant according to claim 1, wherein the means for illuminating the tube comprises a flashed opal, means for illuminating the opal comprising a light bulb disposed beyond the tube at a fixed distance from the intersection of the axes, the arrangement being such that the opal due to its location at the intersection of said axes receives uniform illumination irrespective of relative movement of the axis of the gyroscope and the light bulb.

4. In an optical system including a combining mirror for a sextant or the like for use on unstable craft, a stabilized reticle arrangement comprising a tubular member, a gyroscope enclosed in a casing, a gimbal ring mounting therefor, means for maintaining the member in predetermined alignment with the spin axis of the gyroscope comprising means for supporting the member for rotation about two intersecting axes, a connection between the member and a pivot of the gimbal ring for turning the member about one of the axes, a connection pivoted to the member and to the gyroscope casing for turning the member about the other of the axes, means for illuminating the interior of the tubular member supported substantially at the intersection of said axes, a reticle disposed in the tube so as to be illuminated by said means, optical means for projecting a beam of light from said illuminating means shaped by the reticle onto the combining glass as a reference for objects viewed through the optical system, means normally fixed with respect to the craft for projecting onto the mirror an image indicative of the relative position of the craft with respect to the beam of light from the reticle and the objects viewed through the optical system.

5. A sextant comprising a vertical telescope tube mounted for rotation about its longitudinal axis and having an optical system including a transparent mirror through which celestial objects may be viewed, a reticle, a source of light for illuminating the reticle, a common movable support to which the reticle and source are fixed in spaced relation, a vertical gyroscope, coupling means for the support and gyroscope for maintaining the support parallel with the spin axes of the gyroscope, a rotary translucent screen provided with a device for indicating the angular position to which the telescope tube has been rotated with respect to an axis of a supporting craft, the support for the reticle being so disposed that light rays from the reticle project an image thereof on the translucent screen, optical means for projecting an image of the screen onto the combining mirror whereby images of the reticle and indicating device may be observed to be used as references for the images of the celestial objects viewed therethrough, a gear drive coupling the telescope tube with the screen for maintaining the screen and indicating device thereon in predetermined position with respect to an axis of the supporting craft irrespective of the rotary movement of the telescope tube.

6. A sextant comprising a vertical telescope tube mounted for rotation about its longitudinal axis and having an optical system including a transparent mirror through which celestial objects may be viewed, a rotary screen provided with an indicating device adapted to be set in predetermined relation to an axis of a supporting craft, means for projecting an image of the screen onto the transparent mirror whereby the indicating device may be observed with the objects viewed through the optical system, gear means coupling the screen and telescope tube for maintaining the screen in predetermined position irrespective of the rotary movement of the telescope tube whereby the indicating device serves as a reference from which the extent of the rotation of the tube may be observed while viewing celestial objects.

7. A sextant according to claim 6, in which a further reference is provided comprising a stabilized reticle, and means for projecting an image of the reticle together with that of the screen onto the transparent mirror.

ORLAND E. ESVAL.
WALTER WRIGLEY.